May 27, 1930. A. W. FORBES 1,760,591

FREQUENCY CHANGER

Filed Nov. 10, 1927

Inventor
Allan W. Forbes
By Attorneys

Patented May 27, 1930

1,760,591

UNITED STATES PATENT OFFICE

ALLAN W. FORBES, OF WORCESTER, MASSACHUSETTS

FREQUENCY CHANGER

Application filed November 10, 1927. Serial No. 232,395.

This invention relates to a device for changing an alternating current of one frequency to an alternating current of another frequency.

The principal object of the invention is to provide a single mechanism for accomplishing the above mentioned result to take the place of the two machines heretofore used for that purpose.

The invention also, involves means for securing a greater output by the use of a direct current in addition to the alternating current. Another object of the invention is to provide a frequency changer which is reversible. Other objects and advantages of the invention will appear hereinafter.

Reference is to be had to the accompanying drawings in which

In order to secure the above mentioned results I provide a core of magnetic material with coils of wire ordinarily placed in slots around the core. The windings may have any number of coils as in induction motors.

Current is introduced into one winding causing a rotary member of magnetic material mounted on a structure of non-magnetic material to turn at a synchronous speed. An additional winding containing a different number of coils is placed on the same core. The rotary magnetic structure is so arranged that all poles of the same polarity magnetized by the first winding are under one pole of the second winding or spaced an even number of poles apart. Poles of unlike polarity are under adjacent poles or spaced an odd number of poles apart.

Current is taken from the second windings and it will be seen that an alternating current is produced of a different frequency from that of the original, depending on the number of poles in the two sets of coils.

Additional coils may be used to give as many phases as may be desired, all the forms shown being of single phase. This frequency changer is reversible, because current can be applied in the opposite way to that just described and the frequency multiplied or divided in accordance with the windings that are connected with the source of power.

Figure 1:
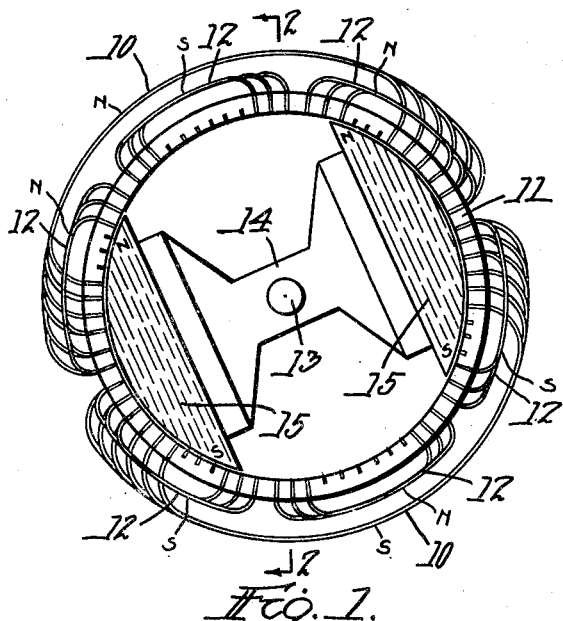
Fig. 1 is a diagrammatic end view of a frequency changer constructed in accordance with this invention arranged for trebling the frequency.
Figure 2:
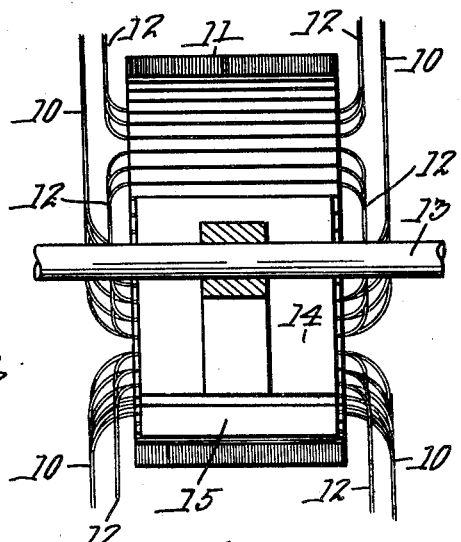
Fig. 2 is a diametrical sectional view of the same, also diagrammatic in form, on the line 2—2 of Fig. 1.
Figure 3:
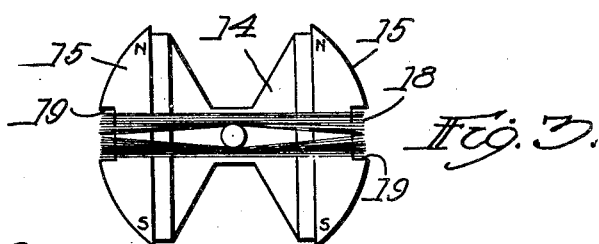
Fig. 3 is an end view of the rotary member of the mechanism shown in Fig. 1 with an additional feature which I consider the preferred embodiment of the invention.

In the form shown in Figs. 1, 2 and 3 I have shown a construction in which one winding consists of two coils 10 on an annular core 11 of magnetic material. On the same core is another winding 12 of six poles. Mounted concentrically with the circular core 11 is a shaft 13, free to rotate, on which is a structure 14 of non-magnetic material. This carries two pieces 15 of soft iron, readily magnetizable by the magnetic lines of force set up by the windings connected with a source of alternating current. These are placed in the magnetic field so that the magnetism will take its place in the iron, forming a restricted path or paths, instead of being distributed uniformly, as would be the case if there were no iron in the interior of the core 11.

When the current is turned on to pass through the windings 10, magnetism is induced, causing the rotatable structure to rotate at synchronous speed. The rotation of this magnetic structure sets up a current in the other windings 12 which current is the product of this machine. The latter current, being produced by windings having a different number of poles from the original current, is at a different frequency. In this case three times the frequency of the original current.

The iron structure is so arranged that all poles magnetized by the two-pole winding of the same polarity are under the same pole of the second winding or spaced an even number of poles apart. Poles of unlike polarity are spaced an odd number of poles apart. This is indicated in the figures by the letters N and S to indicate the north and south poles.

It is clear that in this construction there is a complete reversal of the magnetism through the winding six times during a revolution of the rotating structure in order to produce an alternating current of three times the frequency of the original.

In Fig. 3 I have shown an addition which is adapted to be applied to any of these forms but I have shown it as applied to the form shown in Fig. 1. This consists of the use of a coil 18 on the rotating structure 14, preferably wound in grooves or recesses 19 in the soft iron pieces 15. This coil is connected with a direct current line and enables me to secure greater output by means of the additional magnetism thus produced.

Figure 4:
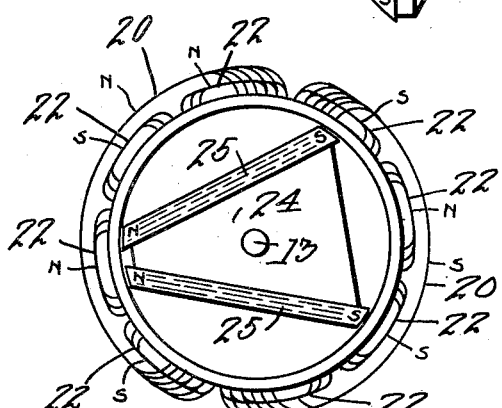
Fig. 4 is a view similar to Fig. 1 showing means for quadrupling the frequency.

In the form shown in Fig. 4 I have shown a winding 20 of two poles and a winding 22 of eight poles. The successive coils of each winding are wound in the opposite directions. Eight reversals are produced, giving four times the frequency if one winding is energized by operating current and one-quarter the frequency if reversed. In this case the rotating structure 24 is provided with soft iron pieces 25 which are arranged in an angular manner as indicated for the purpose of carrying the invention out under the same principles as shown in Fig. 1, that is, with all the poles magnetized by the two-pole winding of the same polarity under the same coil of the second winding or spaced an even number of coils apart and with the poles of unlike polarity spaced on odd number of coils apart. This is the reason for mounting the soft iron metal members 25 at an angle to each other.

Figure 5:
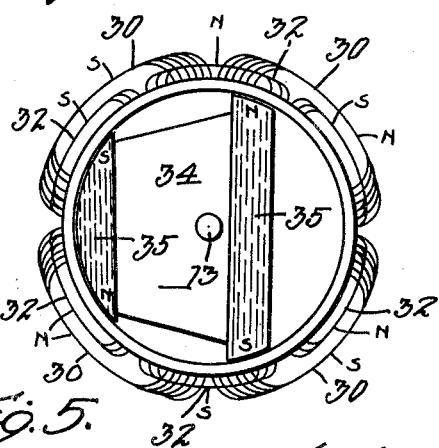
Fig. 5 is a similar view showing windings for increasing the frequency one and one half times.

In Fig. 5 I have shown another embodiment of the invention arranged for a four-pole winding 30 energizing a six-pole winding 32. This produces six reversals of magnetism in the six-pole winding for every four reversals in the original current and gives a frequency one and one half times as great. Here, also, the supporting member 34 must have a different shape and the two soft iron pieces 35 are arranged differently for the purpose of securing the same relationship as just specified above in connection with Fig. 4.

It will be understood that the windings may have any number of poles as used in induction motors and any number of phases, although I have shown all these forms as arranged for one phase.

In operation when the current is applied to the winding, 10, 20 or 30, a magnetic field is produced as indicated in Figs. 1, 4 and 5. The pieces of iron placed in this magnetic field cause the magnetism to be concentrated along the iron pieces instead of being distributed uniformly. These pieces of iron are arranged so that the poles of the same polarity have the relationship to the coils which is stated above, especially in connection with the description of Fig. 4.

In each case the current established in one of the windings causes the rotary structure to rotate at synchronous speed and this movement of the magnetic field inside, the core 11, or the like, having secondary windings thereon, induces a current in these windings at a different frequency. These currents can be taken off and used for whatever purpose may be desired. This current may be increased in intensity by the coil 18 energized by a direct current from the outside.

This frequency changer is a very simple construction, involving only one rotating part and taking the place of two machines now employed ordinarily. It is reversible so that the frequency can be increased or decreased according to the winding that is connected with the original current.

It will be understood that the illustrations of different ways of using this invention do not exhaust the subject, as other structures will be readily apparent, to anyone skilled in the art, corresponding to any given number of poles in each winding. Additional windings, of course, can be used to give as many phases as may be desired. Although I have illustrated and described only three forms of the invention I am aware of the fact that other modifications can be made therein by any person skilled in the art without departing from the scope of the invention as expressed in the claims.

Therefore, I do not wish to be limited in these respects but what I do claim is:—

1. In a frequency changer, the combination with a magnetic core and two windings thereon having different numbers of poles, with a rotary member adapted to be magnetized by one winding and adapted to generate a current in the other of a different frequency and comprising two magnetizable members spaced apart on opposite sides of the center and each extending across the core inside.

2. In a frequency changer, the combination with a magnetic core and two windings thereon having different numbers of poles, with a rotary magnetizable member located within the core, said magnetizable member comprising chordal pieces of iron and a structure of non-magnetic material on which the pieces of iron are located and by which they are separated, arranged to turn freely on an axis concentric with the center of said core.

In testimony whereof I have hereunto affixed my signature.

ALLAN W. FORBES.